(12) United States Patent
Murata et al.

(10) Patent No.: US 7,738,902 B2
(45) Date of Patent: Jun. 15, 2010

(54) TRANSMISSION POWER CONTROL METHOD

(75) Inventors: Shuuichi Murata, Kawasaki (JP);
Yutaka Kobayashi, Kawasaki (JP);
Shinya Okamoto, Yokohama (JP);
Yoshihiro Terashima, Yokohama (JP);
Makoto Uchishima, Kawasaki (JP)

(73) Assignees: Fujitsu Limited, Kawasaki (JP); NTT DoCoMo, Inc., Tokyo (JP)

( * ) Notice: Subject to any disclaimer, the term of this patent is extended or adjusted under 35 U.S.C. 154(b) by 1070 days.

(21) Appl. No.: 10/862,611

(22) Filed: Jun. 7, 2004

(65) Prior Publication Data

US 2004/0259584 A1  Dec. 23, 2004

(30) Foreign Application Priority Data

Jun. 13, 2003  (JP)  ............. 2003-169663

(51) Int. Cl.
*H04B 7/00* (2006.01)
(52) U.S. Cl. ............ 455/522; 455/69; 455/70; 370/318
(58) Field of Classification Search ........ 455/522, 455/69–70; 370/318, 320
See application file for complete search history.

(56) References Cited

U.S. PATENT DOCUMENTS

| | | | | |
|---|---|---|---|---|
| 6,035,210 | A * | 3/2000 | Endo et al. | 455/522 |
| 6,044,277 | A * | 3/2000 | Tsuda | 455/522 |
| 6,549,785 | B1 * | 4/2003 | Agin | 455/522 |
| 2002/0165004 | A1 * | 11/2002 | Chen et al. | 455/522 |
| 2002/0187802 | A1 * | 12/2002 | Agin et al. | 455/522 |
| 2003/0003875 | A1 * | 1/2003 | Oestreich | 455/69 |
| 2004/0038699 | A1 * | 2/2004 | Toono | 455/522 |
| 2004/0121794 | A1 * | 6/2004 | Koo et al. | 455/522 |
| 2006/0040697 | A1 * | 2/2006 | Komatsu | 455/522 |
| 2007/0218937 | A1 * | 9/2007 | Koo et al. | 455/522 |

FOREIGN PATENT DOCUMENTS

EP  1 069 704  1/2001

(Continued)

OTHER PUBLICATIONS

European Search Report and Annex to the European Search Report dated Feb. 13, 2008, for corresponding European Application EP 07 10 4623.

(Continued)

*Primary Examiner*—Edward Urban
*Assistant Examiner*—Fayyaz Alam
(74) *Attorney, Agent, or Firm*—Katten Muchin Rosenman LLP

(57) ABSTRACT

Disclosed is a transmission power control method in a wireless communication system in which power allocated to a pilot signal can be varied to at least a first power and a second power. The method includes the steps of measuring reception quality using power of a receive pilot signal and power of an interference signal thereof when reception quality is measured with regard to whichever of the larger of the first power and second power is allocated; measuring reception quality using the power of the receive pilot signal and overall reception power when reception quality is measured with regard to whichever of the smaller of the first power and second power is allocated; and sending a transmission power control signal to a transmitting side in such a manner that the measured reception quality will agree with a target reception quality.

2 Claims, 16 Drawing Sheets

FOREIGN PATENT DOCUMENTS

| | | |
|---|---|---|
| EP | 1069704 | 1/2001 |
| EP | 1 139 685 | 10/2001 |
| EP | 1 248 388 | 10/2002 |
| JP | 2001-217773 | 8/2001 |
| JP | 2002-185398 | 6/2002 |
| JP | 2002-217829 | 8/2002 |
| JP | 2003-18089 | 1/2003 |
| JP | 2003-032168 | 1/2003 |
| JP | 2003-37558 | 2/2003 |
| JP | 2003-78484 | 3/2003 |

OTHER PUBLICATIONS

Notification of Reasons for Refusal dated Jul. 8, 2008, from the corresponding Japanese Application.

Notification of Reasons for Refusal dated Dec. 2, 2008, from the corresponding Japanese Application.

* cited by examiner

FIG. 6

| BEARER | INITIAL BLER (%) | Sinc (dB) | Sdec (dB) | Tmax |
|---|---|---|---|---|
| PKT | 5.0 | 0.1 | −0.3 | 24 |
| AMR | 0.5 | 0.5 | −0.1 | 32 |
| UDI | 0.005 | 0.6 | −0.1 | 2741 |

FIG. 15 PRIOR ART

| SLOT FORMAT NO. | Bit Rate (kbps) | SF | Bits/Slot (bits) | N$_{Data1}$ (bits) | N$_{Data2}$ (bits) | N$_{TPC}$ (bits) | N$_{TPC1}$ (bits) | N$_{pilot}$ (bits) | PILOT RATIO (%) |
|---|---|---|---|---|---|---|---|---|---|
| 0 | 15 | 512 | 10 | 0 | 4 | 2 | 0 | 4 | 40 |
| 1 | 15 | 512 | 10 | 0 | 2 | 2 | 2 | 4 | 40 |
| 2 | 30 | 256 | 20 | 2 | 14 | 2 | 0 | 2 | 10 |
| 3 | 30 | 256 | 20 | 2 | 12 | 2 | 2 | 2 | 10 |
| 4 | 30 | 256 | 20 | 2 | 12 | 2 | 0 | 4 | 20 |
| 5 | 30 | 256 | 20 | 2 | 10 | 2 | 2 | 4 | 20 |
| 6 | 30 | 256 | 20 | 2 | 8 | 2 | 0 | 8 | 40 |
| 7 | 30 | 256 | 20 | 2 | 6 | 2 | 2 | 8 | 40 |
| 8 | 60 | 128 | 40 | 6 | 28 | 2 | 0 | 4 | 10 |
| 9 | 60 | 128 | 40 | 6 | 26 | 2 | 2 | 4 | 10 |
| 10 | 60 | 128 | 40 | 6 | 24 | 2 | 0 | 8 | 20 |
| 11 | 60 | 128 | 40 | 6 | 22 | 2 | 2 | 8 | 20 |
| 12 | 120 | 64 | 80 | 12 | 48 | 4 | 8 | 8 | 10 |
| 13 | 240 | 32 | 160 | 28 | 112 | 4 | 8 | 8 | 5 |
| 14 | 480 | 16 | 320 | 56 | 232 | 8 | 8 | 8 | 5 |
| 15 | 960 | 8 | 640 | 120 | 488 | 8 | 8 | 16 | 2.5 |
| 16 | 1920 | 4 | 1280 | 248 | 1000 | 8 | 8 | 16 | 1.25 |

TRANSMISSION POWER CONTROL METHOD

BACKGROUND OF THE INVENTION

This invention relates to a transmission power control method and, more particularly, to a transmission power control method in a wireless communication system for controlling transmission power on the transmitting side in such a manner that measured reception quality will agree with a target reception quality.

In W-CDMA (Wideband-Code Division Multiple Access) mobile communications, multiple channels are distinguished from one another by spreading codes assigned to the channels, thereby allowing communication by multiple channels sharing a single frequency band. In an actual mobile communications environment, however, a receive signal is susceptible to interference from its own channel and from other channels owing to delayed waves ascribable to multipath fading and radio waves from other cells, and this interference has an adverse influence upon channel separation. Further, the amount of interference sustained by a receive signal varies with time owing to momentary fluctuations in reception power ascribable to multipath fading and changes in the number of users communicating simultaneously. In an environment in which a receive signal is susceptible to noise that varies with time in this fashion, it is difficult for the quality of a receive signal in a mobile station linked to a base station to be maintained at a desired quality in a stable manner.

In order to follow up a change in number of interfering users and a momentary fluctuation caused by multipath fading, inner-loop transmission power control is carried out. In such control, the signal-to-interference ratio (SIR) is measured on the receiving side and the measured SIR is compared with a target SIR, whereby control is exercised in such a manner that the SIR on the receiving side will approach the target SIR.

Inner-loop Transmission Power Control

FIG. 9 is a diagram useful in describing inner-loop transmission power control. Here only one channel of the system is illustrated. A spread-spectrum modulator 1a of a base station 1 spread-spectrum modulates transmit data using a spreading code conforming to a specified channel. The spread-spectrum modulated signal is subjected to processing such as orthogonal modulation and frequency conversion and the resultant signal is input to a power amplifier 1b, which amplifies this signal and transmits the amplified signal toward a mobile station 2 from an antenna. A despreading unit 2a in the receiver of the mobile station applies despread processing to the receive signal and a demodulator 2b demodulates the receive data. A SIR measurement unit 2c measures the power ratio between the receive signal and an interference signal and a comparator 2d compares target SIR and measured SIR. If the measured SIR is greater than the target SIR, the comparator 2d creates a command that lowers the transmission power by a TPC (Transmission Power Control) bit. If the measured SIR is less than the target SIR, on the other hand, the comparator 2d creates a command that raises the transmission power by the TPC bits. The target SIR is a SIR value necessary to obtain, e.g., $10^{-3}$ (error occurrence at a rate of once every 1000 times). This value is input to the comparator 2d from a target-SIR setting unit 2e. A spread-spectrum modulator 2f spread-spectrum modulates the transmit data and TPC bits. After spread-spectrum modulation, the mobile station 2 subjects the signal to processing such as a DA conversion, orthogonal modulation, frequency conversion and power amplification and transmits the resultant signal toward the base station 1 from an antenna. A despreading unit 1c on the side of the base station applies despread processing to the signal received from the mobile station 2, and a demodulator 1d demodulates the receive data and TPC bits and controls the transmission power of the base station 1 in accordance with a command specified by the TPC bits.

FIG. 10 is a diagram showing the structure of an uplink DPCH (Dedicated Physical Channel) frame standardized by the $3^{rd}$ Generation Partnership Project (referred to as "3GPP" below). There is a DPDCH channel (Dedicated Physical Data Channel) on which only transmit data is transmitted, and a DPCCH channel (Dedicated Physical Control Channel) on which control data such as a pilot and TPC bit information, described above with reference to FIG. 9, is multiplexed. After each of these is spread by an orthogonal code, they are mapped onto real and imaginary axes and multiplexed. One frame of the uplink has a duration of 10 ms and is composed of 15 slots (slot #0 to slot #14). The DPDCH channel is mapped to an orthogonal I channel and the DPCCH channel is mapped to an orthogonal Q channel. Each slot of the DPDCH channel consists of n bits, and the n varies in accordance with the symbol rate. Each slot of the DPCCH channel that transmits the control data consists of ten bits, has a symbol rate of 15 ksps and transmits a pilot PILOT, transmission power control data TPC, a transport format combination indicator TFCI and feedback information FBI.

Outer-loop Transmission Power Control

Owing to changes in traveling velocity during communication and changes in the propagation environment ascribable to travel, the SIR that is necessary to obtain a desired quality (the block error rate, or BLER) is not constant. It should be noted that BLER is the ratio of the total number of transport blocks (TrBk) over a fixed period of time to the number of transport blocks TrBk in which CRC error has occurred over this period.

In order to deal with these changes, the BLER is observed and control is exercised so as to increase the target SIR if the observed value of BLER is inferior to the target BLER and decrease the target SIR if the observed value of BLER is superior to the target BLER. Control that thus changes the target SIR adaptively in order to achieve the desired quality is well known as outer-loop transmission power control (outer-loop TPC).

FIG. 11 is a block diagram of well-known outer-loop control. According to this scheme, a signal that has been transmitted from the base station 1 is decoded by an error correcting decoder 4a after it is demodulated by the demodulator 2b. The decoded signal is then applied to a CRC detector 4b where it is divided into transport blocks TrBk and subsequently subjected to CRC error detection on a per-TrBk basis. The result of error detection applied to each transport block TrBk is sent to target-SIR controller 4c.

In W-CDMA as currently standardized, encoding is performed on the transmitting side in the manner shown in FIG. 12. Specifically, if a plurality (N) of transport blocks TrBk exist in a unit transmission time (Transmission Time Interval, or TTI), a CRC add-on circuit on the transmitting side generates a CRC (Cyclic Redundancy Code) error detection code for every transport block TrBk and adds this onto the transmit data. An encoder on the transmitting side joins the N-number of transport blocks TrBk having the attached CRCs and encodes the blocks by error correcting coding such as convolutional coding or turbo coding. On the receiving side the error correcting decoder 4a subjects the receive data to error-correction decoding processing and inputs the result of decoding to the CRC detector 4b, and the CRC detector 4b performs CRC error detection for every transport block TrBk constituting the result of decoding and inputs the results of error detection to the target-SIR controller 4c.

Immediately after a dedicated channel DCH (Dedicated CH) call is placed to the target-SIR controller 4c, a host application specifies the required BLER that conforms to the service type of the DCH, such as voice, packet or unrestricted digital. In outer-loop control, let BLERquality represent the required BLER, let Tmax represent the number of transport blocks TrBk for which BLER is measured, let Sinc (dB) represent an update quantity for raising the target SIR in a case where the measured BLER is inferior to the required BLER, and let Sdec (dB) represent an update quantity for lowering the target SIR in a case where the measured BLER is superior to the required BLER. If there is even one CRC NG (CRC error) in Tmax-number of BLER measurement periods, the target SIR is updated by Sinc. If CRC OK holds throughout, the target SIR is updated by Sdec. When this is observed in total, the target SIR settles stabilizes at a fixed level. This is the fundamental concept of outer-loop control. According to this concept, the values Sinc, Sdec and Tmax are decided so as to satisfy the following equation:

$$(1-BLER_{quality})^{Tmax} \times Sdec = [1-(1-BLER_{quality})^{Tmax}] \times Sinc \quad (1)$$

It should be noted that $(1-BLER_{quality})^{Tmax}$ indicates the probability that the CRC check will be correct Tmax-times in succession, and $[1-(1-BLER_{quality})^{Tmax}]$ indicates the probability that there will be even one CRC check error in Tmax times.

More specifically, BLER measurement is performed with regard to Tmax-number of transport blocks TrBk. If CRC OK is obtained for all TrBk, the target SIR is updated by Sdec. If there is even one CRC NG (CRC error), then the target SIR is updated by Sinc. The values of Sinc, Sdec and Tmax are values uniquely decided by the required BLER of each service.

Relationship Between Service Quality and SIR Update Interval

Transforming Equation (1), we have the following:

$$T\text{max} = \log\{1/[1+(Sdec/Sinc)]\}/\log(1-BLER\text{quality}) \quad (2)$$

The value of BLERquality satisfies the relation 0<BLERquality<1, the numerator on the right side is a negative value at all times, and the denominator on the right side also is a negative value at all times. Therefore, the higher the required quality of the BLER, i.e., the lower the value of BLERquality, the greater the value of Tmax. For example, if Sinc=0.1 dB, Sdec=−0.3 dB holds, then Tmax=270 will be obtained when BLERquality=5×10$^{-2}$ holds and Tmax=277224 will be obtained when BLERquality=5×10$^{-5}$ holds. Thus, the higher the quality of the required quality of BLER, the greater the value of Tmax.

Control of Target SIR

The initial value of the target SIR is the same for all bearers (all services). A point that is positively above a convergence point (the convergence target SIR) is set as the initial target SIR beforehand. At the moment a CRC result concerning the receive signal appears after the connection of a call, the target SIR is updated based upon this result. More specifically, if an error is not detected whenever a CRC check is performed, the target SIR is reduced a prescribed value at a time starting from the initial target SIR. When an error is detected, from this point onward the error rate is measured at a target-SIR update period T that conforms to the service, this measured error rate is compared with a required error rate and the target SIR is updated accordingly. For example, in case of a TrCH for which TTI Transmission Time Interval)=10 ms holds, a CRC result is ascertained every 10 ms and the target-SIR update period becomes 10 ms. The incremental amount of updating is made a relatively large value so as to detect CRC NG quickly, e.g., a value on the order of −1 dB, which is a value that is ten times the usual. Outer-loop control from the initial value of the target SIR to detection of CRC NG shall be referred to as the "initial state".

After detection of CRC NG, the values of Sinc, Sdec, Tmax are calculated from the required BLER (=BLERquality), which is specified by the host application, using Equation (2), and the target SIR is updated at T (=Tmax×TrBk period). For example, if BLERquality=5×10$^{-2}$ holds, Sinc=0.1 dB, Sdec=|−0.3|dB=0.3 dB, Tmax=270 hold and all CRC results up to the point where 270 transport blocks TrBK are counted are OK, then target SIR is updated by −0.3 dB. If a CRC result is NG (No Good) for even one transport block TrBk, then the target SIR is updated by 0.1 dB. This control for updating target SIR shall be referred to as the "steady state".

Method of Calculating Measured SIR

In the spread receive-symbol data, the power of the DPCH (Dedicated Physical Channel) of the local station is the desired wave power and is defined as DPCH_RSCP [RSCP: Received Signal Code Power (dBm)]. Further, interference waves of a common pilot channel (CPICH: Common Pilot Channel) of other stations not orthogonal to the local DPCH and of the DPCH_RSCP of other stations are defined as ISCP [Interference Signal Code Power (dBm)]. Furthermore, total power (referred to as overall reception power) with respect to all receive signals obtained by despreading the common pilot channel (CPICH) of local/other stations and the dedicated physical channel (DPCH) is defined as RSSI (Received Signal Strength Indicator).

Measured SIR is calculated in accordance with the following equation:

$$SIR = (DPCH\_RSCP - ISCP) \times SF \text{ (dB)} \quad (3)$$

where SF represents the spreading factor of the code and is a value of from 4 to 512. Since Equation (3) is a logarithmic expression, it can be written as follows:

$$SIR = (DPCH\_RSCP/ISCP) \times SF \text{ (dB)} \quad (3)'$$

The downlink (the link from the base station to the mobile station) DPCH frame has a frame period of 10 ms, which is divided into 15 slots, as shown in FIG. 14. Each slot is composed of 2560 chips, and the number of bits per slot is as indicated by the following equation:

$$Tslot = 10 \times 2^k \text{ bits } (k=0, 1, 2, \ldots, 7) \quad (4)$$

Further, the spreading factor SF and k are related as follows:

$$SF = 512/2^k \quad (5)$$

If a signal is received at a high bit rate per unit time 10 ms (i.e., if k is large), the number of chips per bit will be small and the spreading factor SF will be small. Conversely, if a signal is received at a low bit rate, the number of chips per bit will be large and the spreading factor SF will be large.

The spreading factor SF in Equation (3) has a constant value from the connection of a call to the end of the call. The measured SIR is obtained by measuring the value of DPCH_RSCP and the value of ISCP and performing the calculation of Equation (3).

In a case where the measured SIR is found to be higher than the target SIR upon comparing the value of the measured SIR and the value of the target SIR, transmission power control information to the effect that the transmission power is to be lowered is inserted at a prescribed position (the TPC bits) of the DPCCH from the mobile station to the base station. Conversely, if the measured SIR is lower than the target SIR, then transmission power control information to the effect that the transmission power is to be raised is inserted. Transmission power control in the downlink direction is performed upon inserting the proper transmission power control information.

Other Prior Art

In transmission power control, it is necessary to measure the SIR of the receive signal correctly. To accomplish this, the specification of Japanese Patent Application Laid-Open No. 2003-32168 proposes weighting the interference power of each path, thereby measuring the interference power precisely to achieve highly precise SIR measurement.

Further, the specification of Japanese Patent Application Laid-Open No. 2003-18089 proposes varying the amount of updating of a target value adaptively in accordance with changes in the propagation environment, thereby maintaining a desired reception quality irrespectively of the magnitude of any change in propagation environment.

Further, the specification of Japanese Patent Application Laid-Open No. 2003-78484 proposes shortening the time it takes to achieve convergence following the start of transmission power when downlink transmission power control has been carried out.

Problem at Time of Decline in Power Allocated to Pilot Bits

The value of DPCH_RSCP used in the calculation of Equation (3) is a value of the power of the receive-signal DPCH pilot bits of the local station, and the value of ISCP is Equation (3) indicates the value of interference power of other stations, etc. When a propagation environment in which the interference of other stations is small and the value of ISCP is comparatively low is considered, the value of DPCH_RSCP becomes predominant in the measured value of SIR.

FIG. 15 is a table useful in describing slot formats of the downlink DPCH. The table illustrates, for every slot format specified by a slot format number, the relationship between spreading factor SF and number of data bits, TPC bits, TFCI bits and pilot bits per slot and the proportion occupied by the spreading factor SF. The smaller the spreading factor SF, the smaller the ratio of the pilot bits occupying one slot. For example, whereas the pilot ratio is 10 to 40% up to SF=32, the pilot ratio falls to 5% or less from SF=32 onward.

Downlink power (the transmission power of the base station) can be varied on a per-slot basis by TPC control on the side of the mobile station. This will be considered while excluding the effects thereof. Further, it will be assumed that the initial value of downlink power is constant even in a case where the spreading factor SF differs, and that there is no power offset of DPCCH (TPC, TFCI, Pilot) with respect to DPDCH power. In such case the downlink power per slot will be constant even in a case where the spreading factor SF differs and therefore the power allocated to the pilot bits will be proportional to the pilot ratio.

For example, assume that the power of one slot is Pslot. If SF=512 holds, the pilot ratio will be 40% and therefore pilot-bit power will be 0.4×Pslot. However, if SF=4 holds, the pilot ratio will be 1.25% and therefore pilot-bit power will be 0.0125×Pslot.

In this case, the pilot-bit power at SF=4 gives rise to a difference of $10 \log_{10}(0.0125 \times Pt) - 10_{log\ 10}(0.4 \times Pt) = -15$ dB in comparison with SF=512.

In actuality, when the spreading factor SF becomes small, there is a tendency for the power allocated to the pilot bits to diminish, though there is a difference between a state in which data is packed in the DPDCH and a state (Discontinuous Transmission, or DTX) in which there are portions with no data. In a case where the power allocated to the pilot bit is small, the value of power in the pilot portion of the DPCCH develops a corresponding amount of error. This causes an error in the measured value of SIR. By way of example, if it is assumed that the ISCP value is constant in Equation (3), the receive signal at SF=4 will incur an SIR measurement error (SIR variance) of 15 dB in comparison with the situation at SF=512 on the assumption that there is no DTX of the data portion.

Downlink power when such SIR variance occurs will be considered.

Let T represent the duration of measurement, BLERquality the required BLER over this period, Sinc_total the total update value on the + side in the measurement period T and Sdec_total the total update value on the − side in the measurement period T. Sinc, Sdec represent the amount of update per time, $(1-BLERquality)^T$ is the probability that CRC NG will not appear at all over the time T, and $1-(1-BLERquality)^T$ is the probability that CRC NG will appear one or more times over the time T, and therefore Equation (6) below holds. (Sdec, which is the update quantity on the − side, represents the absolute value of the actual amount of decrease. For example, Sdec=|−0.1|=0.1 in case of −0.1 dB.)

$$Sdec\_total/Sinc\_total = \{[(1-BLER_{quality})^T] \times Sdec\}/\{[(1-(1-BLER_{quality})^T)] \times Sinc\} \qquad (6)$$

In the measurement period T, control that causes the measured value of BLER to agree with the required BLER (=BLERquality) is performed and BLERquality takes on a value that satisfies the inequality 0<BLERquality<1. As a result, the content of the power of $(1-BLERquality)^T$ in Equation (6) takes on a value smaller than 1. The larger T, therefore, the smaller the value of $(1-BLERquality)^T$.

Accordingly, when T is large, the value of Sdec_total/Sinc_total is small. Conversely, when T is small, Sdec_total/Sinc_total is large. In other words, if power allocated to pilot bits diminishes and SIR variance occurs, then the smaller T, the larger Sdec_total.

The fact that T is small means that the observation period of BLER is short, or in other words, that updating of target SIR is performed frequently in order to acquire the required BLER when there is a large SIR variance. In this case, the value of Sdec_total/Sinc_total becomes large. That is, the total value of decrease update on the − side is larger than the total value of increase update on the + side. This is equivalent to saying that because the downlink power results in excessive quality, the value of measured BLER takes on a quality higher than that of the required BLER and a greater amount of decrease updating is applied.

Thus, if variance (SIR variance) ascribable to SIR measurement error becomes excessive, a problem which arises is that downlink power (transmission power) becomes too large and excessive quality is the result. It is apparent from Equation (6), this tendency becomes more pronounced for bearers (services) for which the value of BLERquality is small, i.e., for high-quality bearers (services). This represents a first problem of the prior art.

Problem Relating to Outer-loop Power Control According to the Prior Art

In order for a user to communicate immediately after a call is connected, the necessary control data is set and received frequently between the mobile station and the base station. More specifically, control information to the effect that call connection is to be performed is transmitted from the side of the base station to the side of the mobile station on the DCCH (Dedicated Control Channel). The DCCH delivers the information to a plurality of TTIs (TTI=40 ms), though this depends upon the amount of information for the purpose of call connection.

However, in the initial state of outer-loop control immediately after call connection, control is exercised in such a manner that updating of the target SIR toward the − side is carried out rapidly, whereby the steady state is attained upon causing the appearance of CRC NG. At this time the DCCH control data undergoes Viterbi encoding and becomes a single shot of data, while the DTCH (Dedicated Traffic Channel) data undergoes turbo encoding and is continuous. DTCH data includes UDI (Unrestricted Digital signals) and packets, etc. Consequently, the target SIR attains the stable state upon exceeding a CRC-NG occurrence level $L_C$ of the DCCH, in which the data is a single shot, and arrives at a level $L_D$ at which CRC NG occurs on DTCH, where the data is continuous. Since the DCCD control data is sent and received when the initial state prevails, there is a possibility that some of the necessary data will not be acquired depending upon the communication bearer (service) in the region where the target SIR is less than $L_C$. This represents a second problem encountered in the prior art.

Another Problem Relating to Outer-loop Power Control According to the Prior Art

Consider a case where communication is performed in an environment in which there is a sudden change, measured SIR declines on rare occasion in a shadowing state or the like and measured BLER deteriorates rapidly. In the shadowing state, in which radio waves are interrupted by a building BL, as shown in FIG. 16(A), the target SIR suddenly increases. Then, when the building is passed, the target SIR ideally decreases rapidly. In actuality, however, the target SIR is updated every update time T. In the case of a bearer (service) for which T is short, therefore, the target SIR diminishes in a comparatively short time. However, in the case of a high-quality service for which T is long, a long period of time is required for the target SIR to decline, as indicated by the shading in FIG. 16B. A problem which arises is that there is excessive demand for downlink power (transmission power) during this time. This is a third problem of the prior art.

Thus, the first to third problems cited above remain unsolved in the prior art.

SUMMARY OF THE INVENTION

Accordingly, a first object of the present invention is to prevent transmission power from a base station from becoming excessive even if power allocated to pilot bits diminishes and an error occurs in SIR measurement.

A second object of the present invention is to enable the acquisition of DCCH control data following connection of a call and prevent transmission power from a base station from becoming excessive.

A third object of the present invention is to lower target SIR rapidly and prevent transmission power from a base station from becoming excessive at departure from a shadowing state.

According to a first embodiment of the present invention, the foregoing objects are attained by providing a transmission power control method in a wireless communication system in which power allocated to a pilot signal can be varied to at least a first power and a second power, comprising the steps of: measuring reception quality using power of a receive pilot signal and power of an interference signal thereof when reception quality is measured with regard to whichever of the larger of the first power and second power is allocated to the pilot signal; measuring reception quality using the power of the receive pilot signal and a reception power that includes at least another signal portion in addition to the pilot signal when reception quality is measured with regard to whichever of the smaller of the first power and second power is allocated to the pilot signal; and sending a transmission power control signal to a transmitting side in such a manner that the measured reception quality will agree with a target reception quality.

According to a second embodiment of the present invention, the foregoing objects are attained by providing a transmission power control method in a wireless communication system for controlling transmission power on a transmitting side in such a manner that measured reception quality will agree with a target reception quality, comprising the steps of: measuring reception quality using power of a receive pilot signal and power of an interference signal thereof when a receive signal has a large spreading factor; measuring reception quality using the power of the receive pilot signal and overall reception power when a receive signal has a small spreading factor; and sending a transmission power control signal to the transmitting side in such a manner that measured reception quality will agree with a target reception quality.

In accordance with the first and second embodiments, first and second methods of calculating reception quality are provided. In a case where power allocated to pilot bits declines and reception-quality measurement error in the first method of calculation increases, the reception-quality measurement error is reduced using the second method of calculation. As a result, downlink transmission power from a base station can be prevented from becoming excessive. In other words, excessive power demanded for the downlink can be reduced.

According to a third embodiment of the present invention, the foregoing objects are attained by providing a transmission power control method in a wireless communication system for controlling transmission power on a transmitting side in such a manner that measured quality will agree with a target quality, comprising the steps of: ① if a high-quality service call is made, setting the target quality to be larger than a convergence value so as to satisfy an initial pull-in characteristic, reducing the target quality a prescribed amount if no error is detected whenever an error detection check is made and, when an error has detected, thenceforth measuring error rate at a target-quality update period that conforms to service quality, comparing the error rate measured and a required error rate, and updating the target quality; ② if a low-quality service call is made, setting the target quality to be larger than a value at which a dedicated control channel can be decoded correctly, measuring error rate at a target-quality update period that conforms to service quality, comparing the error rate measured and a required error rate, and updating the target quality; and ③ measuring quality of a receive signal in parallel with control for updating target quality, and sending a transmission power control signal to the transmitting side in such a manner that the measured quality will agree with the target quality.

In accordance with the third embodiment, failure to acquire DCCH control data after call connection is eliminated with regard to a low-quality service call by the control of step ②, and downlink transmission power from a base station can be prevented from becoming excessive with regard to a high-quality service call by the control of step ①.

According to a fourth embodiment of the present invention, the foregoing objects are attained by providing a transmission power control method in a wireless communication system for comparing a measured error rate and a required error rate, updating a target quality and controlling transmission power on a transmitting side in such a manner that measured quality will agree with the target quality, comprising the steps of: detecting that degradation in quality of a receive signal is continuous; after the continuous degradation in quality is detected, detecting that a state in which measured quality is high is continuous; and setting target quality to an initial value when high quality has been detected continuously. The method may include a further step after the initial value is set, namely (4) a step of reducing the target quality a prescribed amount from the initial value if no error is detected whenever an error detection check is made and, when an error has been detected, thenceforth measuring error rate at a target-quality update period that conforms to service quality, comparing the error rate measured and a required error rate, and updating the target quality.

The fourth embodiment is such that when a shadowing state is departed from, target quality is lowered rapidly so that downlink transmission power from a base station can be prevented from becoming excessive.

Other features and advantages of the present invention will be apparent from the following description taken in conjunction with the accompanying drawings.

BRIEF DESCRIPTION OF THE DRAWINGS

FIG. 6 is a table illustrating the relationship between bearers and required qualities;

FIG. 15 is a table for describing the slot formats of a downstream DPCH according to the prior art.

DESCRIPTION OF THE PREFERRED EMBODIMENTS (A) First Embodiment

When the ratio of the number of DPCCH pilot bits is small, there is a measurement error and therefore an error (variance) develops in the measured value of SIR (this is the first problem cited earlier). In order to prevent this, the first embodiment uses the RSSI value in the equation below instead of the ISCP value in Equation (3) when the ratio of the number of pilot bits is small. That is, the target SIR is calculated based upon the following equation:

$$SIR=(DPCH\_RSCP-RSSI) \times SF \text{ (dB)} \quad (7)$$

The RSSI value is the total power (overall reception power) with respect to all receive signals obtained by despreading the common pilot channel (CPICH) of local/other stations and the dedicated physical channels (DPCH).

If the RSSI value is compared with the ISCP value in Equation (3), it will be seen that the RSSI value is the total power obtained by superimposing CPICH power, DPCH_RSCP and interference power. Even if fluctuation in the value of a certain single factor is large, therefore, the amount of fluctuation is small. For example, even if the power allocated to pilot bits is small and a DPCH_RSCP measurement error occurs, there is but little fluctuation in the RSSI value. Further, since the RSSI value becomes the denominator in Equation (6), the absolute value of the denominator is large in comparison with Equation (3), and fluctuation of the SIR value is small even if fluctuation of DPCH_RSCP is large.

Since the ratio of pilot bit length in a receive signal having a small spreading factor SF is small, the measurement error in the value of DPCH_RSCP is large and the SIR variance obtained from Equation (3) is large. On the other hand, since the ratio of pilot bit length in a receive signal having a large spreading factor SF is large, the measurement error in the value of DPCH_RSCP is small and, hence, the SIR variance is comparatively small. Accordingly, the first embodiment is such that SIR is measured using Equation (3) if the spreading factor SF is large and using Equation (6) if the spreading factor SF is small.

The reason for employing Equation (3) is that Equation (3) is more sensitive to changes in DPCH_RSCP and ISCP than Equation (6), and so if the errors in these values are small, SIR can be measured more accurately by Equation (3).

Figure 1:
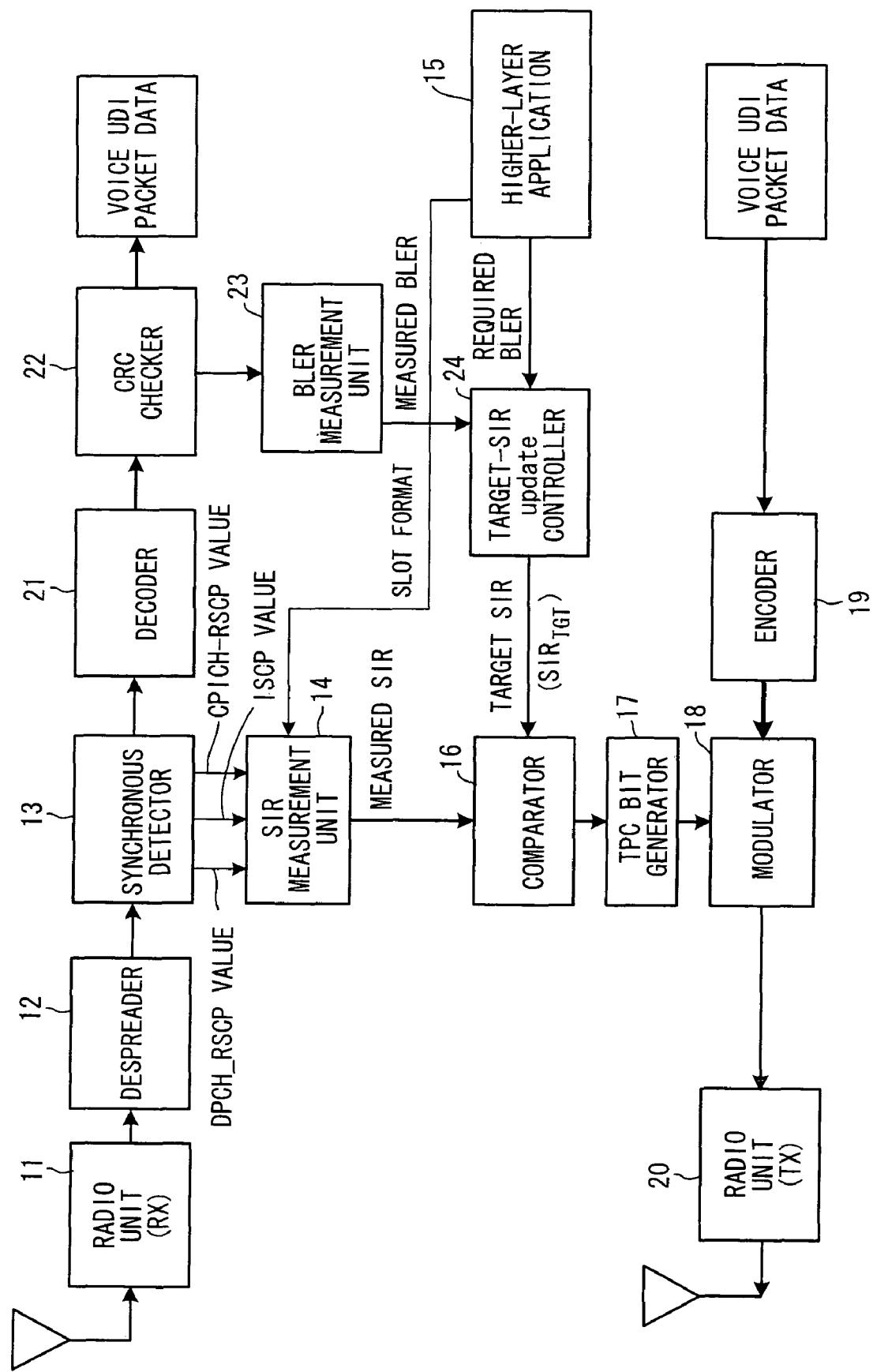
FIG. 1 is a block diagram illustrating a transmission power control apparatus according to a first embodiment of the present invention.

FIG. 1 is a block diagram illustrating a transmission power control in WCDMA mobile communication system apparatus according to the first embodiment.

A radio unit 11 of a mobile station receives a signal transmitted from a base station, subjects the signal to a frequency conversion and orthogonal detection to obtain a baseband signal and inputs the signal to a despreader 12. The latter subjects the receive signal to despread processing to despread the signal and obtain symbol data. More specifically, the despreader 12 subjects CPICH and DPCH to despreading using a scrambling code that differs for every base station and a channelization code that differs for every user and output I/Q complex symbol data. The receive data that undergoes despreading is that of the CPICH of local/other stations and of the DPCH of the local station. A synchronous detector 13 extracts data, TPC, TFCI and pilot in each slot from the despread symbol data, executes averaging of pilot symbols in each slot, performs a power-value calculation by complex multiplication, calculates the CPICH_RSCP value, DPCH_RSCP value and ISCP value and inputs these values to a SIR measurement unit 14.

Figure 2:
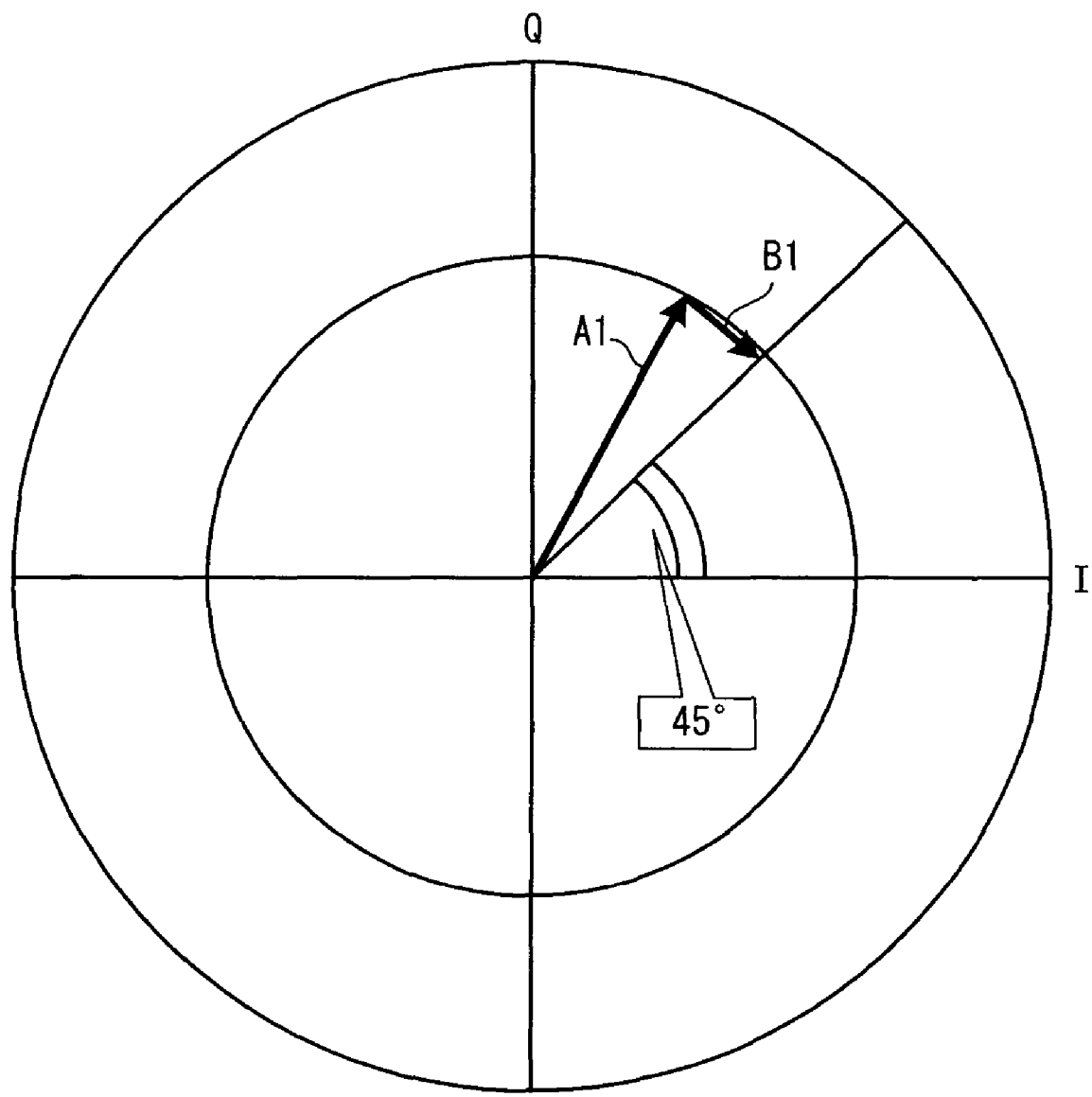
FIG. 2 is a diagram useful in describing a method of calculating an ISCP value.

It should be noted that owing to a change in CPICH that accompanies cell transition, a mobile station despreads and monitors the CPICH of each cell at all times and obtains each CPICH_RSCP value by complex multiplication of the I, Q signals of each CPICH. Further, the mobile station recognizes the current cell of residence at the time of an outgoing call from the side of the mobile station or at the time of an incoming call from a base station, despreads the DPCH on the basis of the CPICH information of the current cell of residence, performs a power calculation by complex multiplication with respect to this DPCH and finds the DPCH_RSCP value. Further, the degree of variance from a fixed point in an I, Q signal constellation of the DPCH is the interference power of CPICH or DPCH from another station with respect to a non-orthogonal signal, and the value of interference power is adopted as the ISCP value. FIG. 2 is a diagram useful in describing a method of calculating the ISCP value. Assume that when a receive pilot symbol obtained by despreading a desired wave is expressed in the I, Q complex plane, it will be a vector A1 in the first quadrant. Though the vector should rightfully appear at an angle of 450, it is shifted from this angle by reason of interference, etc. In such case the power DPCH_RSCP value of the desired wave becomes the length of the vector A1, and the power ISCP of the interference becomes the length of a vector B1.

The SIR measurement unit 14 obtains the spreading factor SF based upon the slot format number of the DPCH that enters from a higher-layer application 15 and determines whether the spreading factor is greater than or less than a set value (e.g., SF=32). If the spreading factor SF is larger than the set value, the SIR value is calculated in accordance with Equation (3) using the DPCH_RSCP value and the ISCP value, and the calculated SIR is adopted as the measured SIR. If the spreading factor SF is less than the set value, then the SIR value is calculated in accordance with Equation (6) using the DPCH_RSCP value and the RSSI value, and the calculated SIR is adopted as the measured SIR. It should be noted that the slot format is fixed until communication ends. Whether the measured SIR is calculated by the method of Equation (3) or Equation (6) is decided when a call is connected.

A comparator 16 compares the target SIR (=$SIR_{TGT}$) and measured SIR. If the measured SIR is greater than the target SIR, a TPC bit generator 17 creates a command that lowers the transmission power by TPC bits. If the measured SIR is less than the target SIR, on the other hand, the TPC bit generator 17 creates a command that raises the transmission power by the TPC bits. A spread-spectrum modulator 18 spread-spectrum modulates the transmit data (voice, UDI, packet data, etc.) and control data (TPC, TFCI, pilot, FBI), which been encoded by an encoder 19, as I, Q signals, respectively. A radio unit 20 subjects the spread-spectrum modulated signal to processing such as orthogonal modulation, frequency conversion and power amplification and transmits the resultant signal toward the base station from an antenna. The base station applies despread processing to the signal received from the mobile station, demodulates the receive data and TPC bits and controls the transmission power of a transmission power amplifier in accordance with a command specified by the TPC bits. The foregoing is inner-loop control and is executed at the slot period.

In parallel with inner-loop control, a decoder 21 subjects the demodulated data (symbol data having a soft-decision bit width) to deinterleave processing and error-correction decode processing based upon Viterbi decoding or turbo decoding, restores repetitious or punctured bits to the original by rate matching processing and inputs the results of decoding to a CRC checker (CRC detector) 22.

The CRC detector 22 performs CRC error detection for every transport block TrBk using the results of decoding and inputs the result of error detection to a BLER measurement unit 23. The latter measures the error rate [measured BLER= (number of erroneous blocks)/(total number of blocks)] in a predetermined time period T and inputs the measured error rate to a target-SIR update controller 24.

The target-SIR update controller 24 compares the measured BLER with a required BLER that enters from the higher-layer application 15 and increases or decreases the target SIR based upon the comparison. Specifically, control is exercised so as to increase the target SIR a prescribed amount if the measured BLER is inferior to the target BLER and decrease the target SIR a prescribed amount if the measured BLER is superior to the target BLER. The foregoing is outer-loop control and is executed at the predetermined time period T, which is longer than the slot period.

If the target SIR is updated by outer-loop control, the comparator 16 compares the target SIR after updating (=$SIR_{TGT}$) and the measured SIR and the TPC bit generator 17 creates the TPC bits based upon the result of the comparison.

Thus, in accordance with the first embodiment, first and second methods of calculating measured SIR are provided. In a case where power allocated to pilot bits declines and SIR measurement error in the first method of calculating measured SIR increases, the measurement error is reduced using the second method of calculating measured SIR. As a result, downlink transmission power from a base station can be prevented from becoming excessive.

It should be noted that although measured SIR is calculated above in accordance with Equations (3), (6) based upon magnitude of the spreading factor SF, it can be so arranged that measured SIR is calculated in accordance with Equations (3), (6) based upon magnitude of the power allocated to the pilot bits.

(B) Second Embodiment

Figure 3:
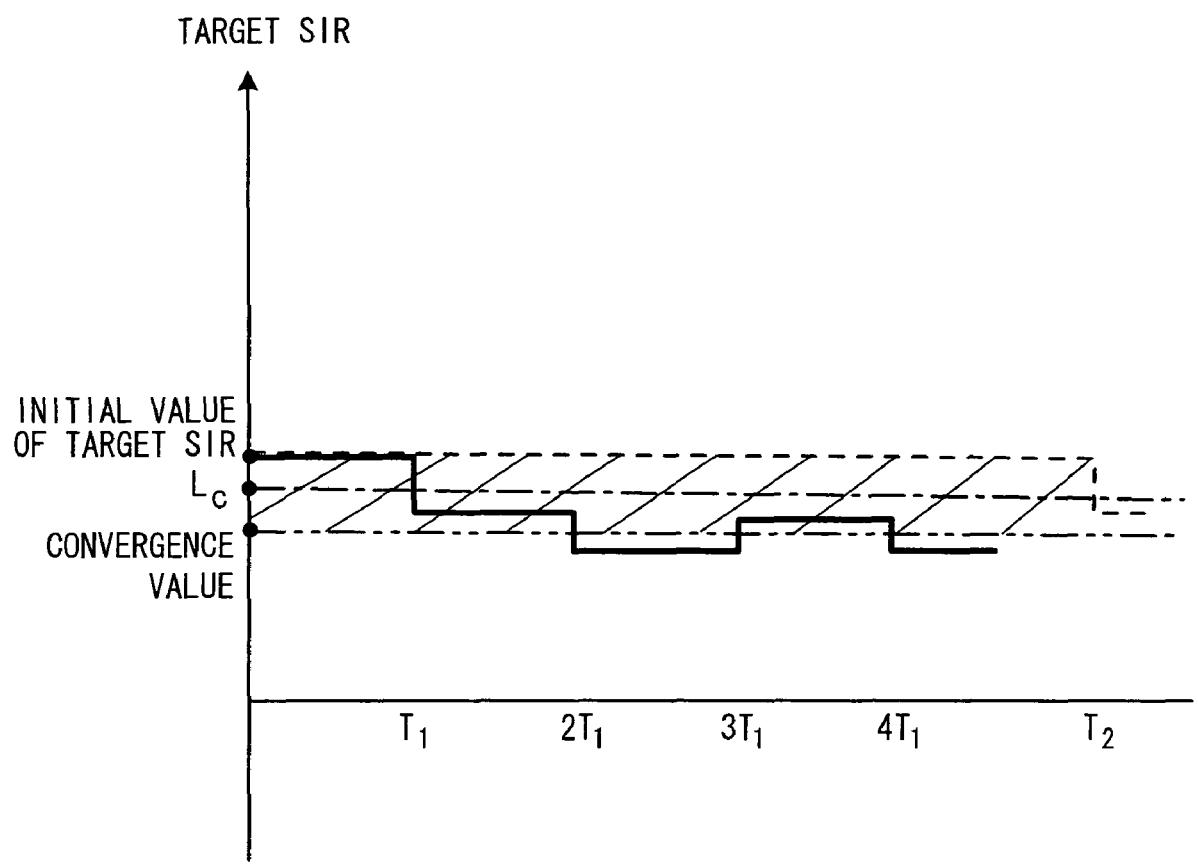
FIG. 3 is a diagram useful in describing a second embodiment of the present invention.

In the prior art (see FIG. 13), control for updating target SIR is always carried out until CRC NG (where "NG" represents "No Good") is detected in the initial state when a call is connected. Consequently, there is a heightened possibility that some of the control data (DCCH control data) will not be acquired when the initial state prevails. Accordingly, in the second embodiment, as shown in FIG. 3, a SIR convergence point is acquired beforehand using experimental data, the initial value of target SIR is set to be larger than a value (=Lc) at which a dedicated control channel DCCH can be decoded correctly, error rate is measured at a target-SIR update period (=T) that conforms to the bearer (service), the measured error rate and a required error rate are compared and the target SIR is updated accordingly. By thus exercising gentle control having a long update period from the outset when a call is connected (i.e., by not exercising control in the initial state), CRC NG will no longer be detected when a call is connected and, hence, the precision with which DCCH control data is received is improved.

If the required BLER is of a low-quality bearer (service), a target-SIR update period T1 will be comparatively short and therefore the target SIR will diminish and converge in a short time, as indicated by the solid line in FIG. 3. If the required BLER is of a high-quality bearer, however, a target-SIR update period T2 will be long and therefore the target SIR will be greater than the converged SIR over an extended period of time, as indicated by the dashed line in FIG. 3. The fact that target SIR is greater than the converged SIR means that downlink power (base-station transmission power) is being demanded excessively. In a case where the required BLER is of a high-quality bearer, therefore, excess power indicated by the hatching in FIG. 3 is being demanded.

Figure 13:
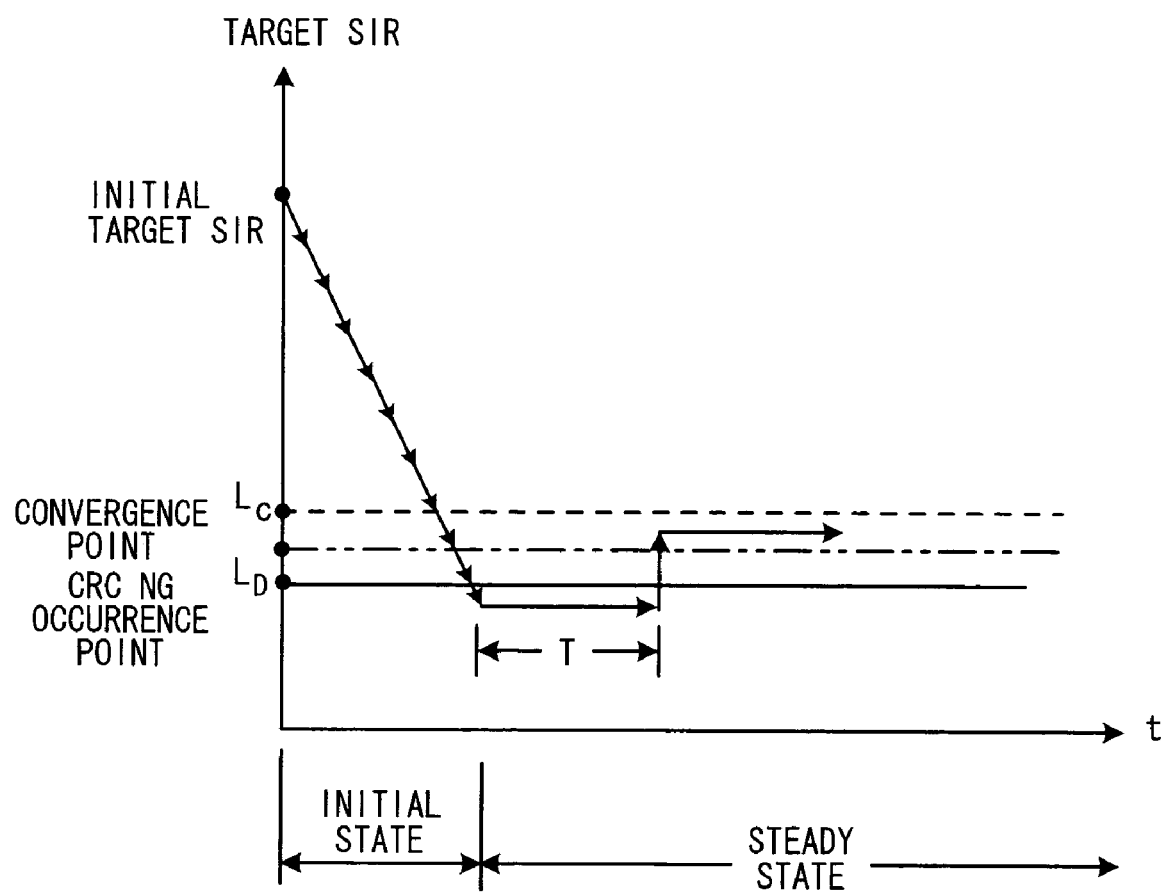
FIG. 13 is a diagram useful in describing control of target SIR according to the prior art.
Figure 14:
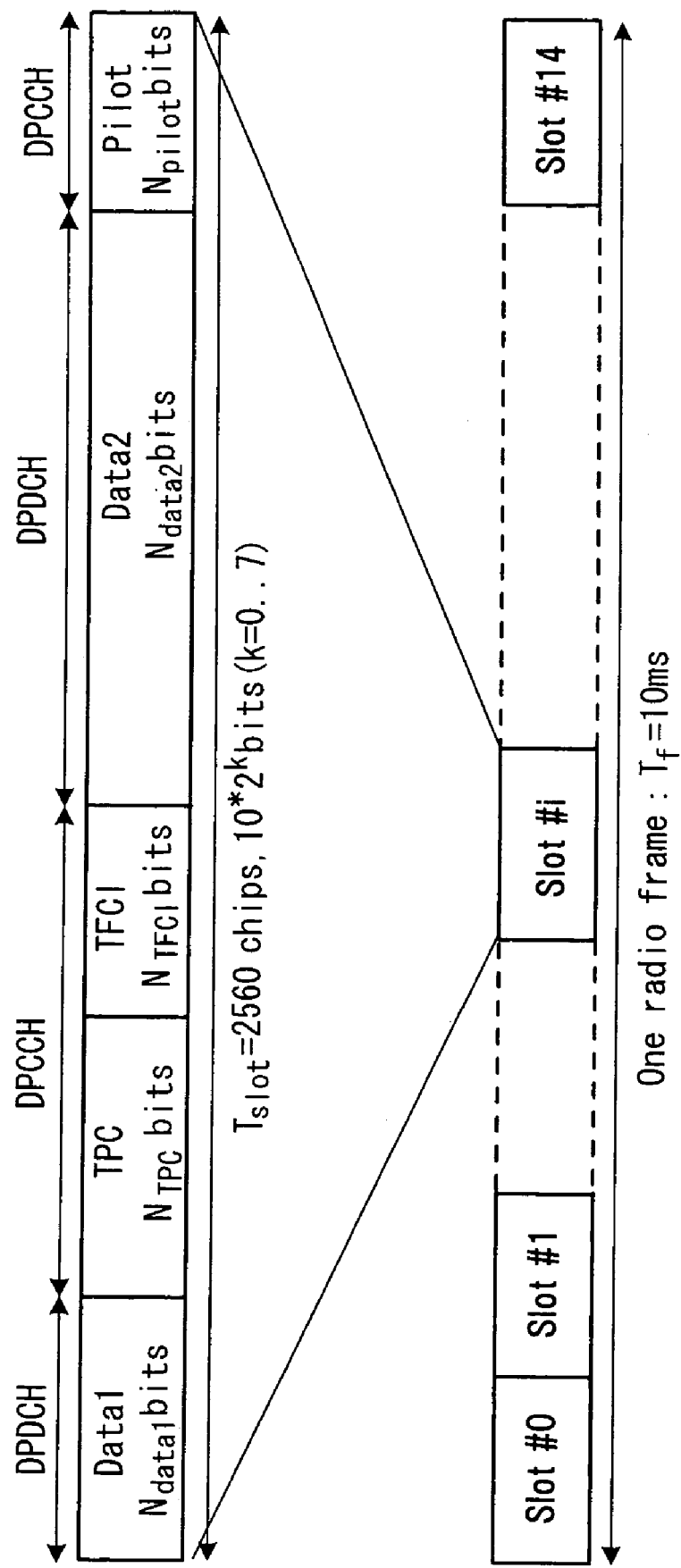
FIG. 14 illustrates a DPCH frame on a downlink from a base station to a mobile station according to the prior art.
Figure 16A:
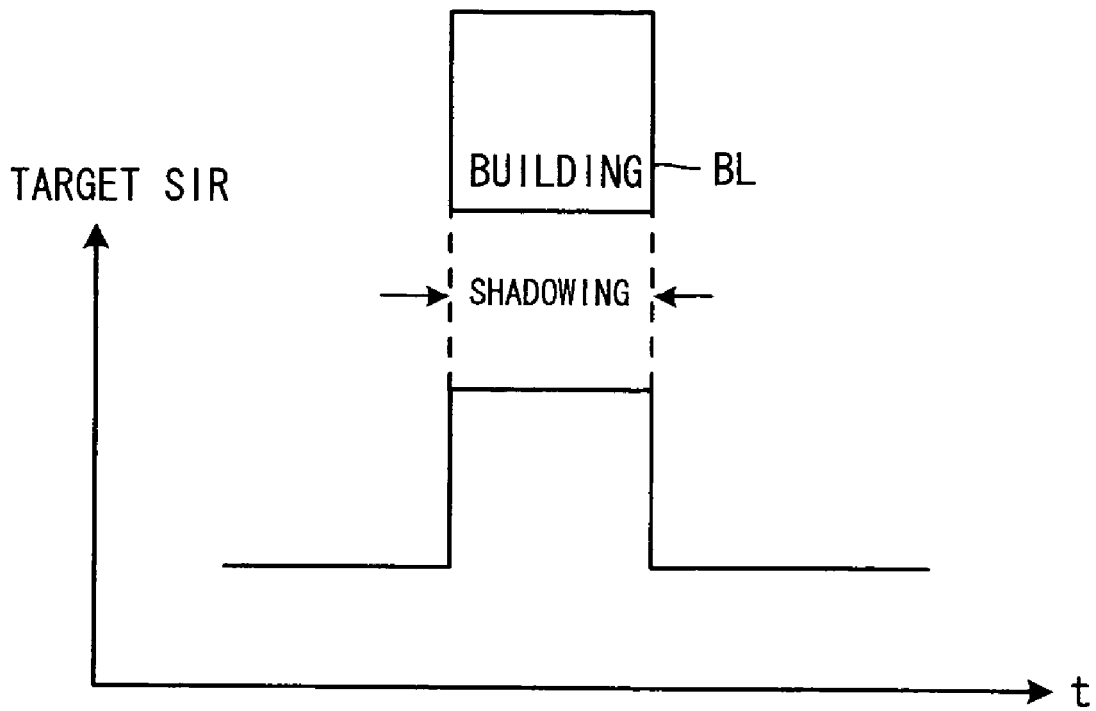
FIGS. 16A and 16B are diagrams useful in describing a problem in the prior art relating to shadowing.
Figure 16B:
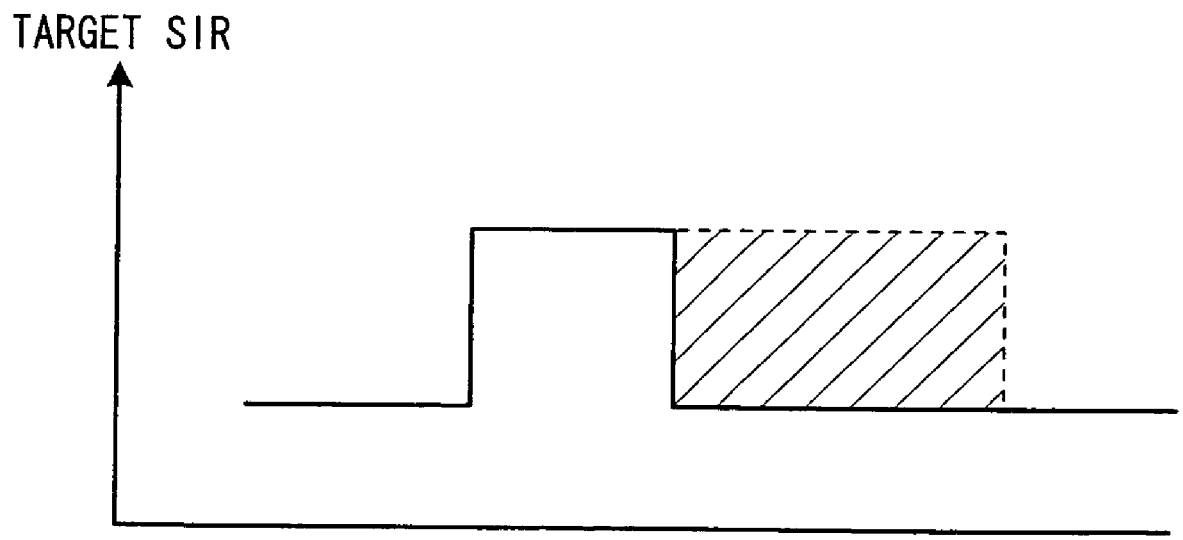

Accordingly, the second embodiment is such that in relation to a low-quality bearer, the conventional initial state is eliminated and outer-loop control is performed starting from a steady state in which the update period is relaxed (FIG. 3). In relation to a high-quality bearer, control in which there is a transition from the initial state to the steady state is performed just as in the prior art (FIG. 13).

Figure 4:
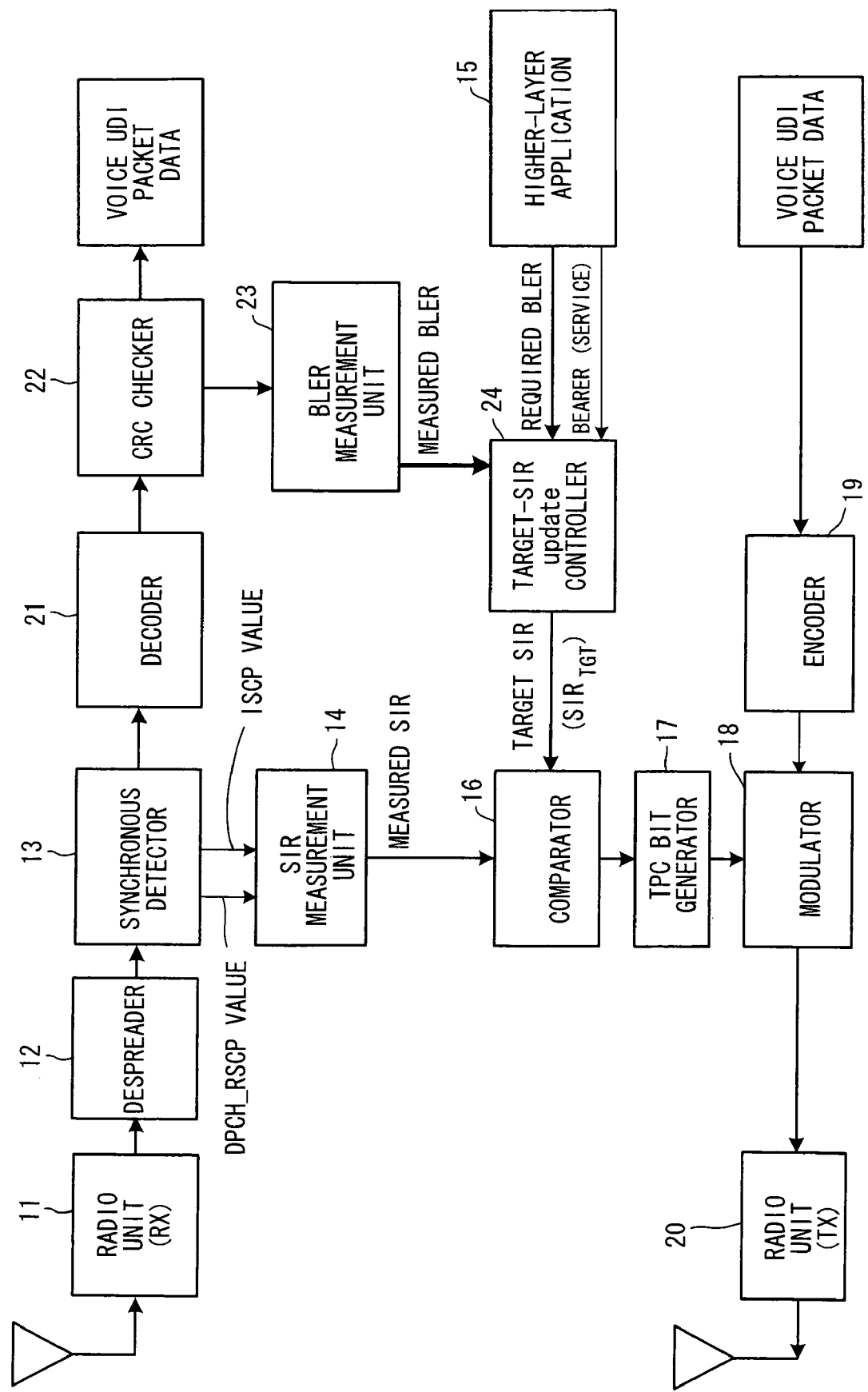
FIG. 4 is a block diagram illustrating a transmission power control apparatus according to the second embodiment.
Figure 5:
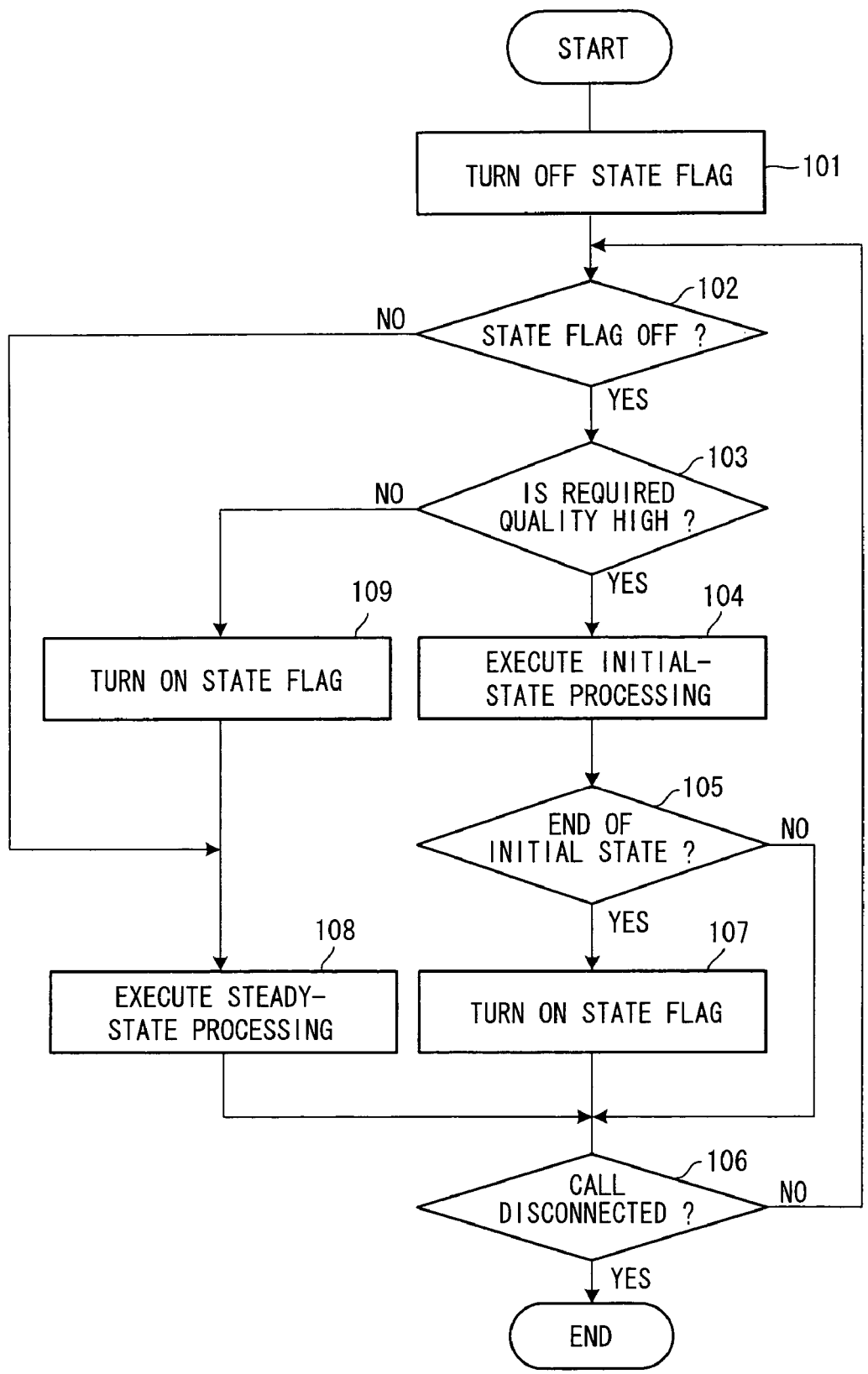
FIG. 5 is a flowchart of processing according to the second embodiment.

FIG. 4 is a block diagram illustrating a transmission power control apparatus according to the second embodiment, and FIG. 5 is a flowchart of processing according to the second embodiment. Components in FIG. 4 identical with those of the first embodiment of FIG. 1 are designated by like reference characters. This embodiment differs from the first embodiment in that ① the SIR measurement unit 14 calculates the measured SIR based solely upon Equation (3), and ② the target-SIR update controller 24 updates the target SIR in accordance with the flowchart of FIG. 5.

Control for updating the target SIR will be described in accordance with the flowchart of FIG. 5. Control for updating target SIR is of two types, namely initial-state control and steady-state control. These states are managed by a flag operation, in which an OFF flag indicates that initial-state control is in effect and an ON flag that steady-state control is in effect.

The gist of control is that the initial value of the state flag at the start of outer-loop control following connection of a call is made OFF (step 101). Then, during outer-loop control, processing from step 102 onward is executed periodically and call disconnect (step 106), etc., is taken as an opportunity to break off processing.

When start of outer-loop control is specified, the target-SIR update controller 24 checks to determine whether the state flag is OFF (step 102). Since the state flag initially is OFF, the target-SIR update controller 24 next checks to determine whether the required quality is that of a high- or low-quality service (step 103). If the required quality is high, control of target SIR in accordance with FIG. 13 is carried out. If the required quality is low, then control of target SIR in accordance with FIG. 3 is performed.

That is, if the required quality is high, the target SIR is updated by initial-state control (step 104), then it is determined whether initial-stage control has ended, i.e., whether CRC NG has occurred (step 105). If CRC NG has not occurred, it is determined whether the call has been disconnected (step 106). If the call has not been disconnected, the processing of steps 102 to 106 is repeated.

If it is found at step 105 that CRC NG has occurred, then the target-SIR update controller 24 terminates initial-state control and turns the state flag ON (step 107). The target-SIR update controller 24 then checks to see whether the call has been disconnected (step 106). Control returns to step 102 if the call has not been disconnected. Now the state flag is ON and the target-SIR update controller 24 thenceforth controls the target SIR by steady-state control (step 108). The target-SIR update controller 24 then determines whether the call has been disconnected (step 106). If the call has not been disconnected, the target-SIR update controller 24 continues steady-state control of the target SIR by executing steps 102 to 108.

If it is found at step 103 that the required quality is low, on the other hand, then the target-SIR update controller 24 turns the state flag ON (step 109) and thence forth controls the target SIR by steady-state control (step 108). The target-SIR update controller 24 then determines whether the call has been disconnected (step 106). If the call has not been disconnected, the target-SIR update controller 24 continues steady-state control of the target SIR by executing steps 102 to 108.

If it is found at step 106 that the call has been disconnected, then the target-SIR update controller 24 terminates control for updating the target SIR and waits for connection of the next call.

In summation, therefore, the second embodiment discriminates whether the required quality is high or low and starts control from the initial state just as in the prior art if the required quality is determined to be high. If the required quality is determined to be low, control is started from the steady state, unlike the prior-art practice.

With regard to the determination concerning required quality, Tmax differs greatly between its value for AMR (Adaptive Multirate) data and its value for UDI (Unrestricted DIgital) data in a case where operation is performed as shown in FIG. 6, by way of example. Accordingly, with BLER=0.1% serving as a boundary, a bearer (AMR, PCK) inferior to 0.1% starts outer-loop control from the steady state, and a bearer (UDI) superior to 0.1% starts outer-loop control from the initial state. Another conceivable method is to use the value of Tmax as the object of the criterion.

In accordance with the second embodiment, failure to acquire DCCH control data following connection of a call is eliminated with regard to a low-quality service call by controlling the target SIR in accordance with FIG. 3. In addition, excessive transmission power on the downlink can be reduced with regard to a high-quality service call by controlling the target SIR in accordance with FIG. 13. In other words, it is possible to prevent transmission power from being demanded excessively.

(C) Third Embodiment

A third embodiment of the present invention monitors quality at all times based upon measured BLER and, if a demand for excessive downlink power is sensed, exercises control that shifts the state to the initial state again and lowers the SIR rapidly down to the SIR convergence point, thereby preventing the downlink transmission power from becoming excessive, i.e., preventing an excessive demand for downlink transmission power. More specifically, this embodiment senses departure from shadowing rapidly during communication using a high-quality bearer and lowers the target SIR accordingly.

Figure 7:
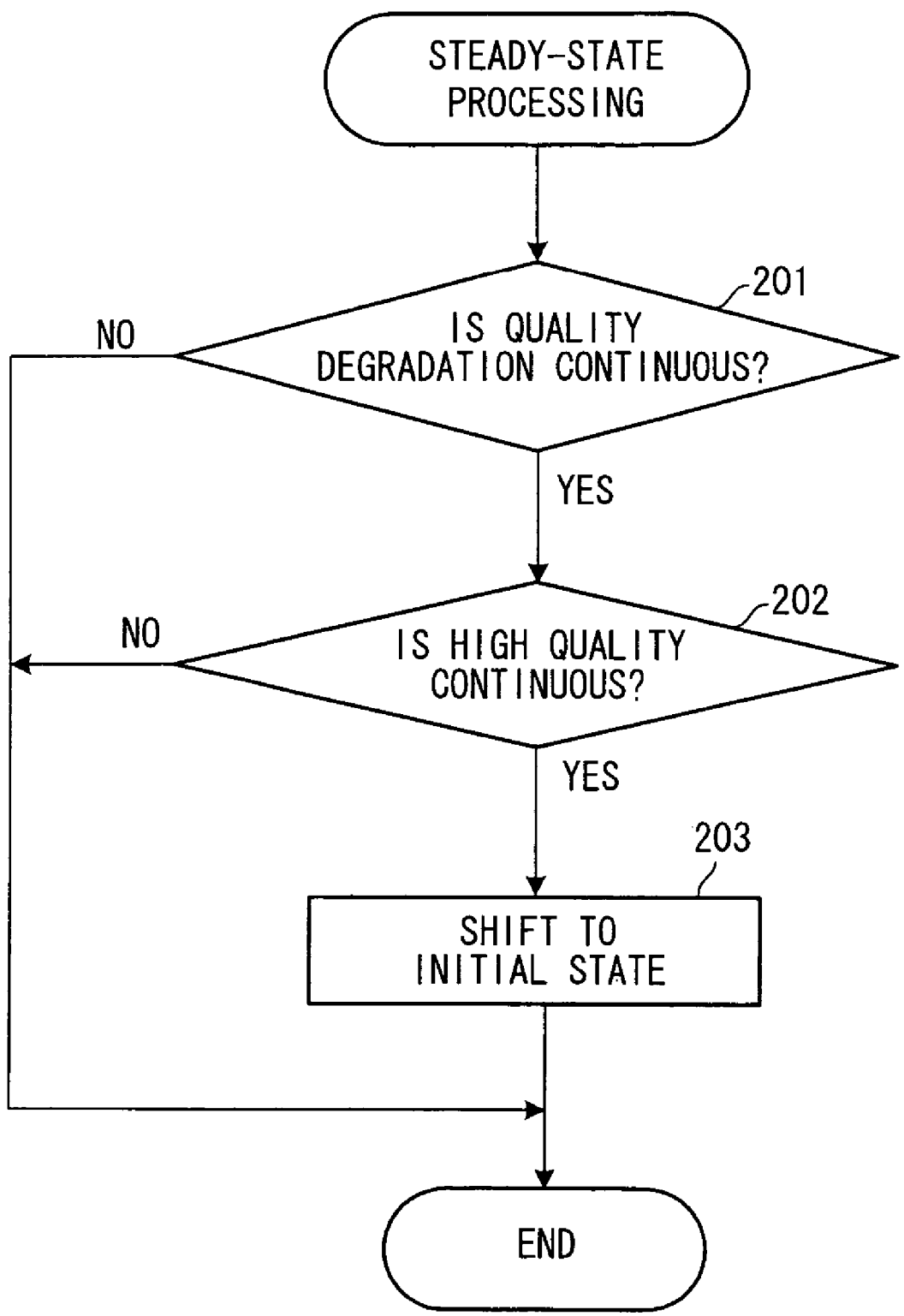
FIG. 7 is a flowchart of processing according to a third embodiment relating to excessive demand for downlink power during communication using a high-quality bearer.

FIG. 7 is a flowchart of processing of the third embodiment executed during communication using a high-quality bearer. The hardware configuration of this embodiment is identical with that shown in FIG. 4. The processing flowchart of FIG. 7 is executed under the control of the target-SIR update controller 24 at the steady-state control step 108 in FIG. 5.

First, the target-SIR update controller 24 measures BLER over a fixed period of time and determines whether a quality degradation is continuous. That is, the controller 24 performs monitoring to determine whether a shadowing environment has been entered.

When a signal is received, the target-SIR update controller 24 measures BLER over the fixed period of time constantly and judges whether quality degradation in the measured BLER during this time meets a predetermined condition. By way of example, on the assumption that application is to UDI, which is a high-quality bearer, let the value of the fixed interval be one second and let the counted number of CRC NG be 50 transport blocks TrBk.

With UDI, four transport blocks TrBk exist in one TTI at TTI=40 ms. Accordingly, the BLER over one second in a case where CRC NG is present in 50 TrBK is {50/[(1000 ms/40 ms)×4 ]}×100=50%. Though such a BLER does not occur during ordinary operation, there is a possibility that it will occur in a case where a sudden shadowing environment is entered. At such time rapid updating of the target SIR on the + side is carried out so that the downlink power from the base station will increase.

If it is determined at step 201 that quality degradation is not continuous, control returns to the beginning and monitoring of quality degradation continues.

If quality degradation occurs continuously, on the other hand, then it is determined whether a high quality is occurring continuously (step 202). That is, whether departure from shadowing has occurred is monitored. After a degradation in quality has been determined at step 201, BLER over a fixed interval is measured similarly and, if all receive signals are found to be CRC OK over this period of time, then it is judged that high quality is continuous.

If continuous quality degradation is sensed at step 201 and then continuous high quality is sensed at step 202, a transition is made to the initial state and control for updating target SIR shown in FIG. 13 is performed to rapidly lower the target SIR (step 203).

If the above-described control is applied to a high-quality bearer such as a UDI bearer, sudden shadowing is entered and excessive downlink power is being demanded, it is possible to obtain an appropriate downlink power instantaneously when the shadowing state is departed and a high-quality state is entered.

Figure 8A:
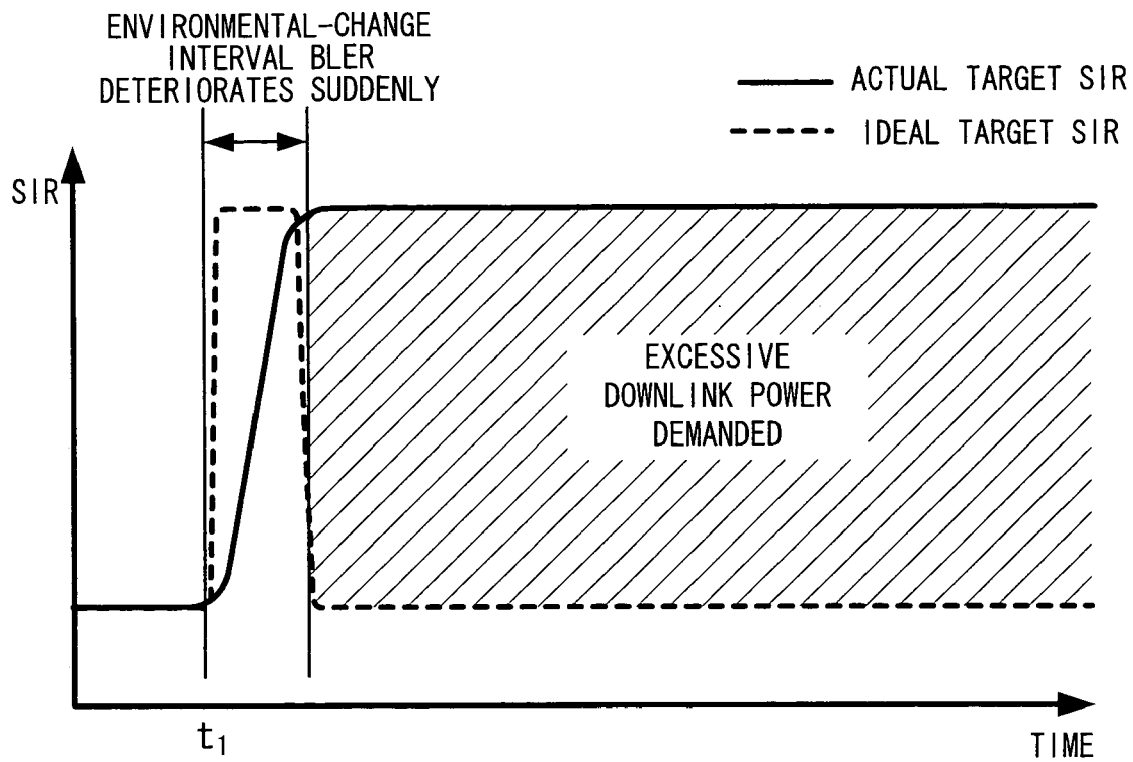
FIGS. 8A and 8B illustrate actual examples of control of target SIR according to the third embodiment.
Figure 8B:
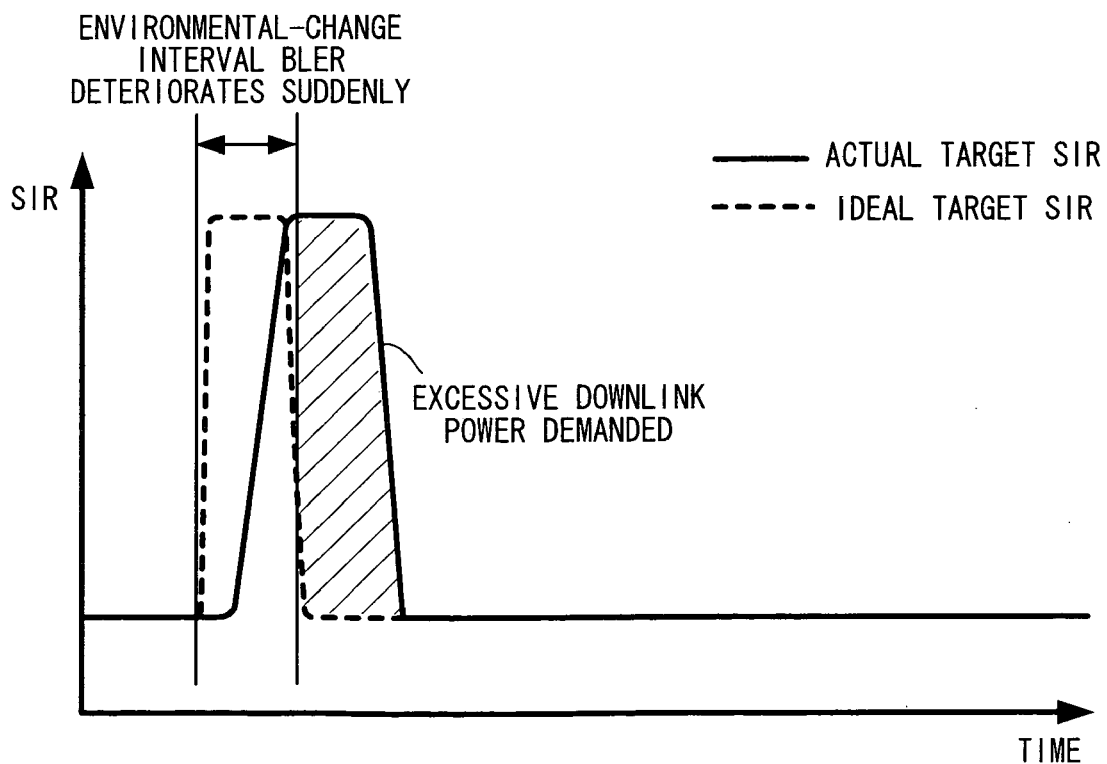
Figure 9:
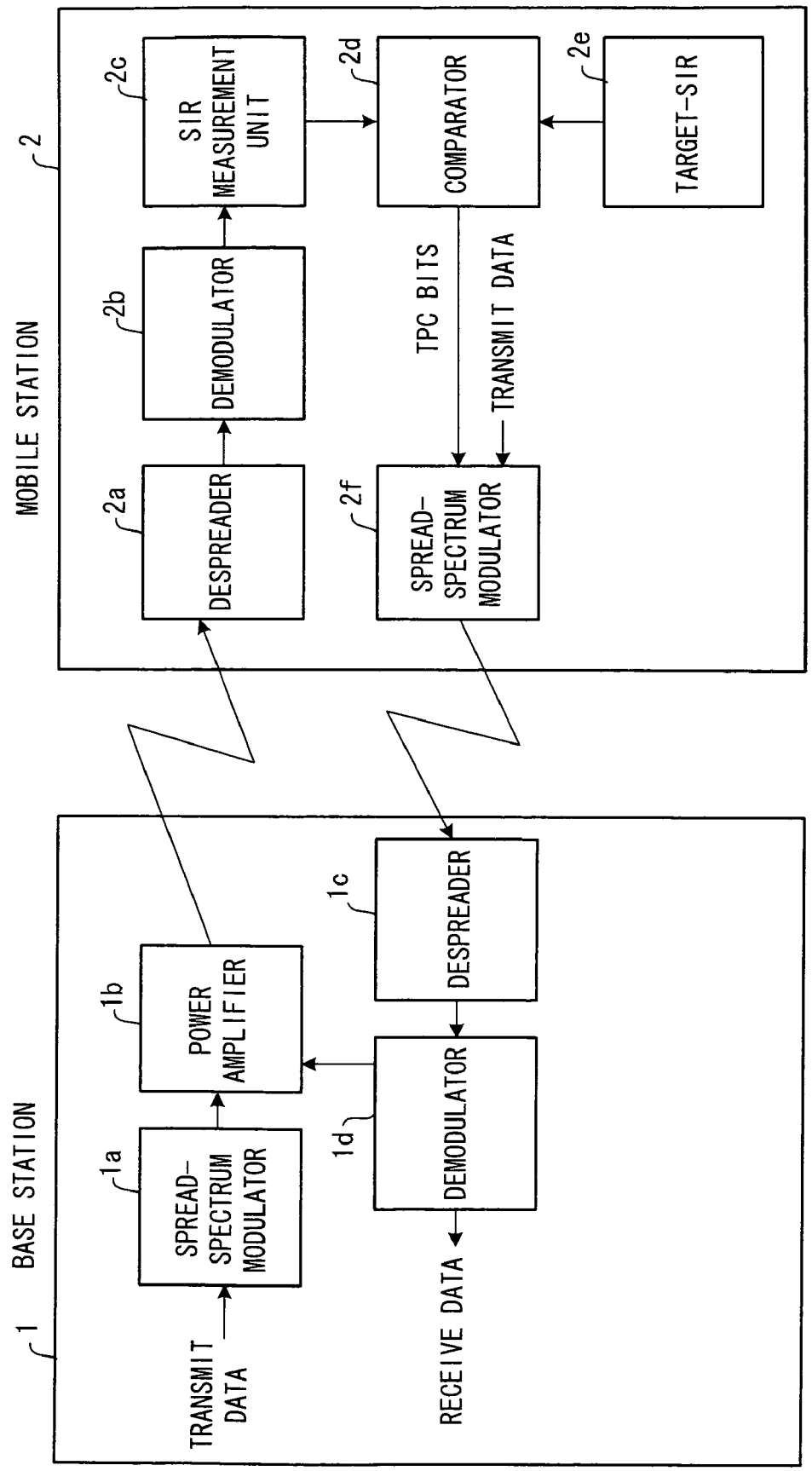
FIG. 9 is a diagram for describing inner-loop transmission power control according to the prior art.
Figure 10:
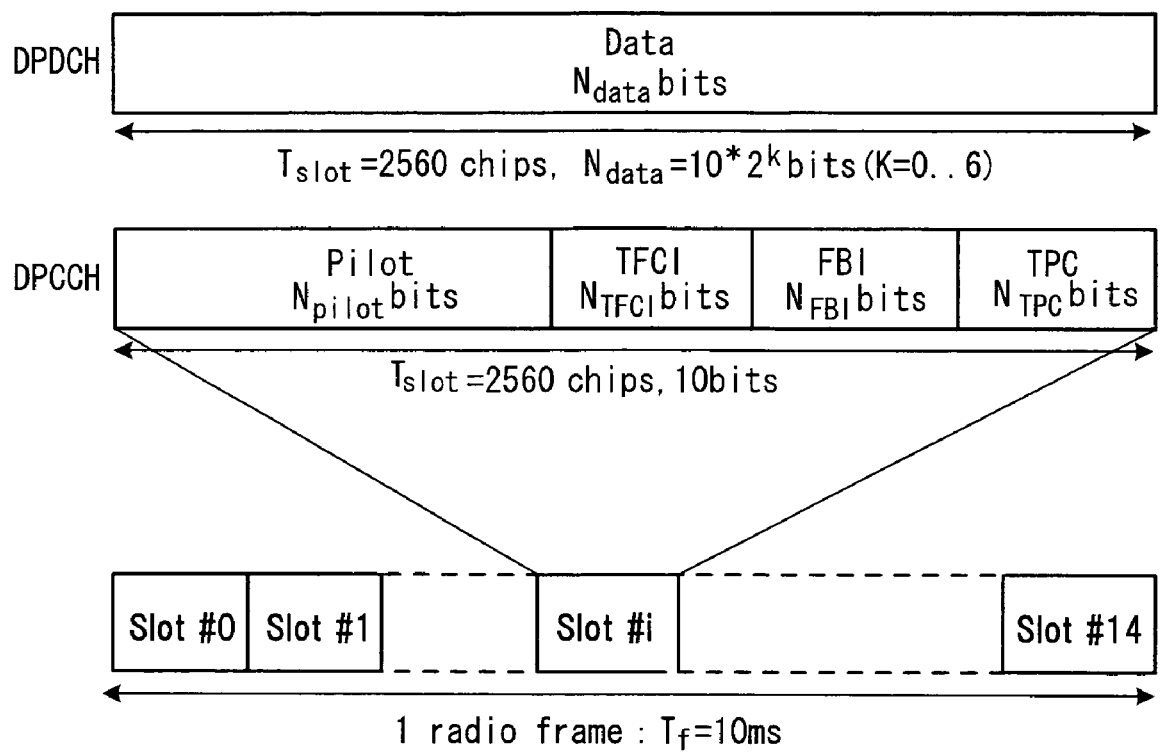
FIG. 10 is a diagram showing the structure of an uplink dedicated physical channel (DPCH) frame according to the prior art.
Figure 11:
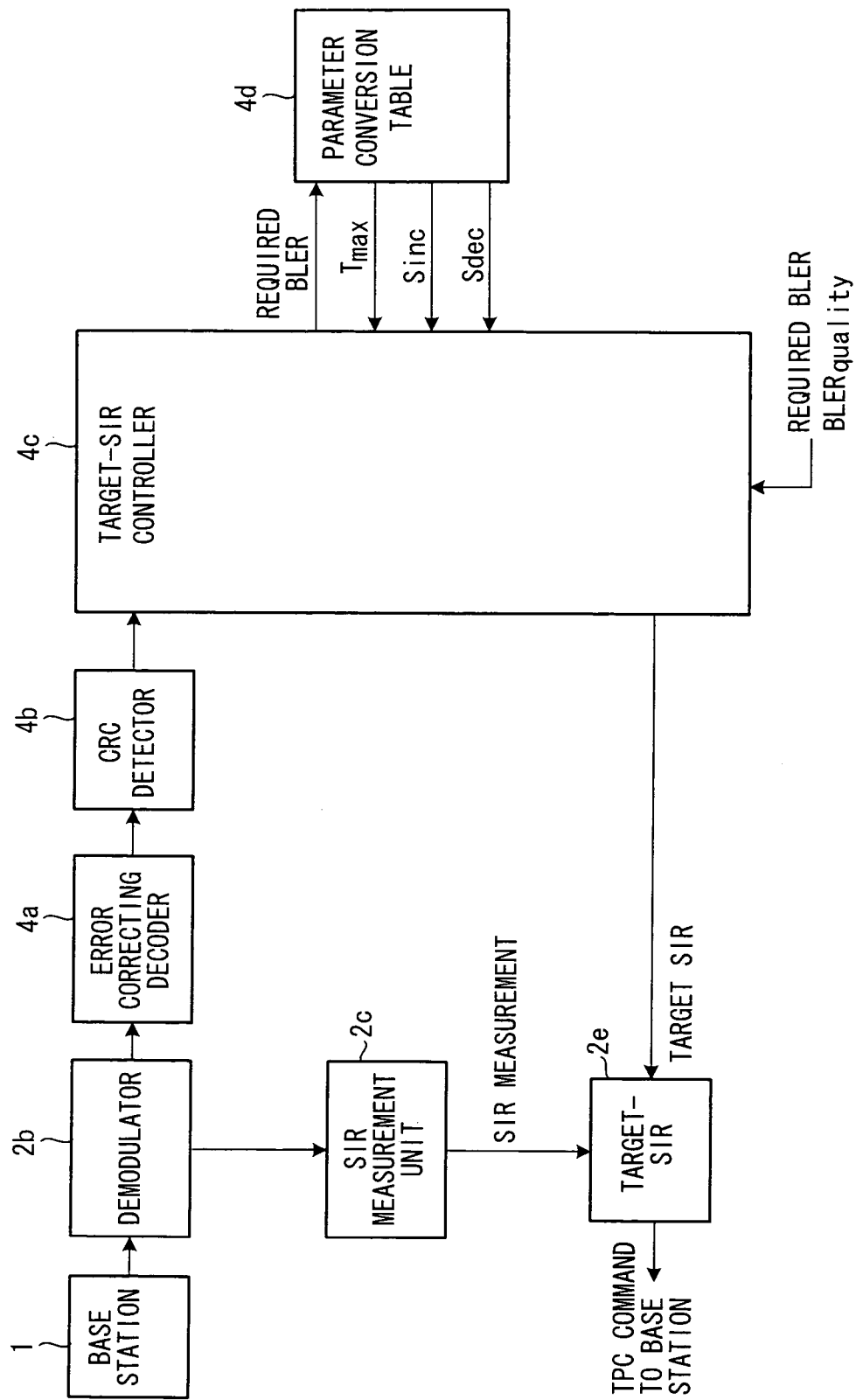
FIG. 11 is a block diagram of well-known outer-loop control according to the prior art.
Figure 12:
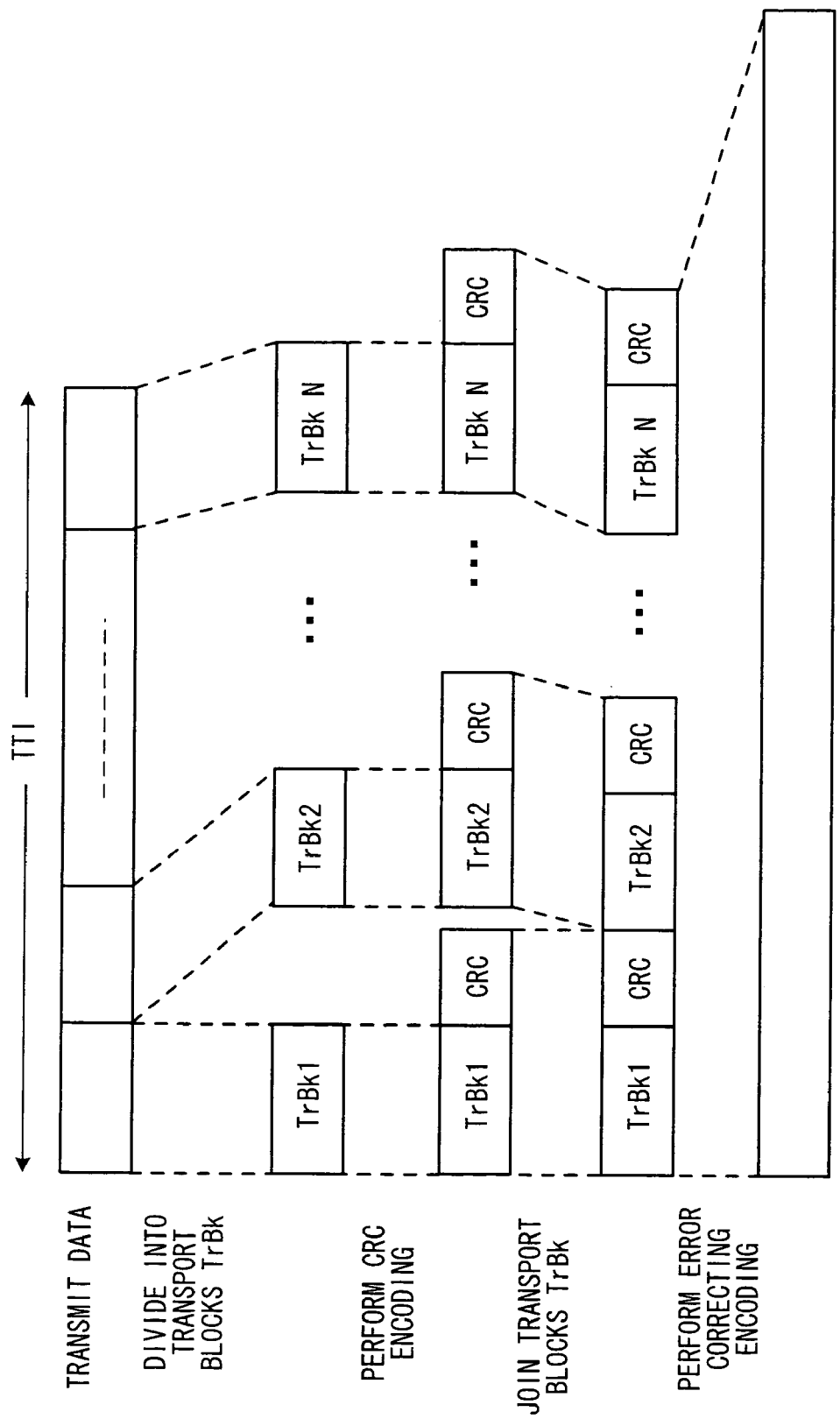
FIG. 12 is a diagram useful in describing encoding in W-CDMA according to the prior art.

FIG. 8A illustrates an example of fluctuation of target SIR according to the prior art, and FIG. 8B illustrates an example of fluctuation of target SIR according to the third embodiment. The dashed lines in FIGS. 8A, 8B indicate ideal target SIR, and the solid lines indicate the actual target SIR (FIG. 8A) according to the prior art and the actual target SIR (FIG. 8B) according to the third embodiment.

In FIG. 8A, a sudden deterioration in BLER occurs owing to an environmental change such as shadowing at time t1, as a result of which target SIR rises sharply and takes on a large value. The prior art is such that even if the shadowing environment is departed from, the − side update control period of the target SIR is very long in a case where communication using a high-quality bearer is in effect, and therefore the large target SIR will not readily decline in this case. The end result is that downlink power does not fall and a state in which transmission is performed with excessive power is prolonged (see the hatched area in FIG. 8A).

In FIG. 8B, target SIR rises sharply and takes on a large value owing to an environmental change identical with that of FIG. 8A. If FIGS. 8A and 8B are compared, it will be appreciated that in accordance with the third embodiment, excessive downlink transmission power can be reduced over the prior art. In other words, the demand for excessive downlink power can be reduced.

Thus, in accordance with the first and second embodiments of the present invention, first and second methods of calculating reception quality are provided. In a case where power allocated to pilot bits declines and reception-quality measurement error in the first method of calculation increases, the reception-quality measurement error is reduced using the second method of calculation. As a result, excessive downlink transmission power from a base station can be reduced. That is, the demand for excessive downlink power can be reduced. Further, this has the effect of diminishing interference upon other mobile stations in the same cell owing to a decrease in downlink transmission power from the base station. Another effect is that as far as the system is concerned, traffic can be increased.

Further, in accordance with the present invention, failure to acquire DCCD control data after call connection can be eliminated with regard to a low-quality service call, and excessive downlink transmission power from a base station can be reduced with regard to a high-quality service call. As a result, according to the present invention, the probability that DCCH control data for call-setup control information immediately after connection of a call will not be received is reduced and the probability that connection of the call will succeed is raised, thereby increasing quality.

In accordance with the present invention, target SIR is lowered rapidly and excessive downlink transmission power can be reduced at such time that a mobile station departs from a shadowing state. In other words, the demand for excessive downlink power can be reduced.

As many apparently widely different embodiments of the present invention can be made without departing from the spirit and scope thereof, it is to be understood that the invention is not limited to the specific embodiments thereof except as defined in the appended claims.

What is claimed is:

1. A transmission power control method in a wireless communication system for comparing a measured error rate and a required error rate, updating a target quality based upon the result of the comparison and controlling transmission power on a transmitting side in such a manner that measured quality will agree with the target quality, comprising the steps of:
measuring Cyclic Redundancy Code (CRC) error of each transport block (TrBk) included in a receive signal over a fixed period of time repeatedly;
calculating Block Error Rate (BLER) for each fixed period of time;
judging that degradation in quality of a receive signal occurs continuously when the calculated BLER is larger than a set value;
detecting a state as a high quality state in which BLER is calculated over the fixed period of time and all receive signals are found to be CRC OK over the fixed period of time;
setting said target quality to an initial value when the high quality state is detected continuously after the degradation in quality has been occurring continuously; and
reducing the target quality by a prescribed amount from the initial value if no CRC error is detected whenever an error detection check of each TrBK is made and, when a CRC error has been detected, thenceforth measuring error rate at a target-quality update period that conforms to service quality, comparing the measured error rate and a required error rate and updating the target quality based upon a result of the comparison.

2. A transmission power control method in a wireless communication system for comparing a measured error rate and a required error rate, updating a target quality and controlling transmission power on a transmitting side in such a manner that measured quality will agree with the target quality, comprising:
a first step of reducing the target quality by a prescribed amount from an initial value if no Cyclic Redundancy Code (CRC) error is detected whenever an error detection check of each transport block (TrBk) is made and, when a CRC error has been detected, thenceforth measuring error rate at a target-quality update period that conforms to service quality, comparing the measured error rate and a required error rate and updating the target quality based upon a result of the comparison; and
a second step of setting said target quality to the initial value wherein said second step includes steps of:
repeatedly measuring CRC error of each TrBk included in a receive signal over a fixed period of time;

calculating Block Error Rate (BLER) for each fixed period of time;

detecting that degradation in quality of a receive signal is continuous when the calculated BLER is larger than a set value;

after the continuous degradation in quality is detected, detecting a state as a high quality state in which BLER is calculated over the fixed period of time and all receive signals are found to be CRC OK over the fixed period of time; and setting said target quality to the initial value when high quality is detected continuously after the continuous degradation in quality has been detected.

* * * * *